(12) United States Patent
Du et al.

(10) Patent No.: US 12,039,864 B2
(45) Date of Patent: Jul. 16, 2024

(54) METHOD OF RECOGNIZING ILLEGAL PARKING OF VEHICLE, DEVICE AND STORAGE MEDIUM

(71) Applicant: BEIJING BAIDU NETCOM SCIENCE TECHNOLOGY CO., LTD., Beijing (CN)

(72) Inventors: Yuting Du, Beijing (CN); Xu Dai, Beijing (CN); Mengyao Sun, Beijing (CN); Shilei Wen, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 178 days.

(21) Appl. No.: 17/730,961

(22) Filed: Apr. 27, 2022

(65) Prior Publication Data

US 2022/0254251 A1  Aug. 11, 2022

(30) Foreign Application Priority Data

Apr. 28, 2021  (CN) .......................... 202110469314.6

(51) Int. Cl.
*G08G 1/017*  (2006.01)
*G06T 3/40*  (2024.01)
(Continued)

(52) U.S. Cl.
CPC ............. *G08G 1/0175* (2013.01); *G06T 3/40* (2013.01); *G06T 7/70* (2017.01); *G06V 10/82* (2022.01);
(Continued)

(58) Field of Classification Search
CPC .. G08G 1/0175; G08G 1/0116; G08G 1/0133; G08G 1/0141; G08G 1/04;
(Continued)

(56) References Cited

U.S. PATENT DOCUMENTS

| | | |
|---|---|---|
| 2014/0266803 A1 | 9/2014 | Bulan et al. |
| 2017/0039424 A1* | 2/2017 | Nerayoff .............. G06Q 50/265 |
| 2019/0065853 A1 | 2/2019 | Sohn et al. |

FOREIGN PATENT DOCUMENTS

| | | |
|---|---|---|
| CN | 101183427 | 5/2008 |
| CN | 103927878 | 7/2014 |

(Continued)

OTHER PUBLICATIONS

Office Action issued in corresponding Japanese Patent Application No. 2022-073279, dated Jan. 27, 2023.
Chinese Office Action issued in corresponding Chinese Patent Application No. 202110469314.6, dated Mar. 23, 2022.

(Continued)

*Primary Examiner* — Daryl C Pope
(74) *Attorney, Agent, or Firm* — Pillsbury Winthrop Shaw Pittman, LLP

(57) ABSTRACT

A method of recognizing illegal parking of a vehicle, a device, and a storage medium, which relate to the field of artificial intelligence, and in particular to the fields of deep learning, cloud computing, computer vision, etc. The method includes: obtaining a video image collected by an electronic device; recognizing a parking area of the vehicle in the video image; determining a shooting angle used by the electronic device for collecting the video image; determining an illegal parking area in the video image based on the shooting angle; and recognizing whether the vehicle is illegally parked or not based on the parking area of the vehicle and the illegal parking area.

20 Claims, 5 Drawing Sheets

(51) Int. Cl.
*G06T 7/70* (2017.01)
*G06V 10/82* (2022.01)
*G06V 20/40* (2022.01)
*G06V 20/54* (2022.01)
*H04N 23/63* (2023.01)

(52) U.S. Cl.
CPC .............. *G06V 20/46* (2022.01); *G06V 20/54* (2022.01); *H04N 23/635* (2023.01); *G06T 2207/10016* (2013.01); *G06T 2207/30236* (2013.01); *G06T 2207/30252* (2013.01); *G06V 2201/08* (2022.01)

(58) Field of Classification Search
CPC .... G08G 1/01; G06T 3/40; G06T 7/70; G06T 2207/10016; G06T 2207/30236; G06T 2207/30252; G06T 7/001; G06T 7/11; G06T 2207/30264; G06V 10/82; G06V 20/46; G06V 20/54; G06V 2201/08; G06V 20/52; G06V 20/40; G06V 20/586; G06V 20/49; H04N 23/635; H04N 7/181; Y02T 10/40; G08B 21/24; G08B 25/00
See application file for complete search history.

(56) References Cited

FOREIGN PATENT DOCUMENTS

| | | |
|---|---|---|
| CN | 10450679 | 9/2014 |
| CN | 105389990 | 3/2016 |
| CN | 108781252 | 11/2018 |
| CN | 109035329 | 12/2018 |
| CN | 109785637 | 5/2019 |
| CN | 111105621 | 5/2020 |
| CN | 111275771 | 6/2020 |
| EP | 3518522 | 7/2019 |
| JP | 2011-192069 | 9/2011 |
| JP | 2019-046464 | 3/2019 |
| JP | 2020-191081 | 11/2020 |
| JP | 2021-036970 | 3/2021 |
| WO | 2019243863 | 12/2019 |

OTHER PUBLICATIONS

European Communication issued in corresponding European Patent Application No. 22170540.3, dated Oct. 31, 2022.
Extended European Search Report issued in corresponding European Patent Application No. 22170540.3, dated Sep. 22, 2022.

\* cited by examiner

METHOD OF RECOGNIZING ILLEGAL PARKING OF VEHICLE, DEVICE AND STORAGE MEDIUM

This application claims the benefit of priority of Chinese Patent Application No. 202110469314.6 filed on Apr. 28, 2021, which is incorporated herein in its entirety by reference.

TECHNICAL FIELD

The present disclosure relates to a field of artificial intelligence, in particular to fields of deep learning, cloud computing, computer vision and the like. Specifically, the present disclosure relates to a method of recognizing illegal parking of a vehicle, a device, and a storage medium.

BACKGROUND

With a continuous development of Internet and artificial intelligence technologies, automated computing and analysis have been used in more and more fields. With a continuous development of, e.g., shared bicycles, increasing number of shared bicycles at important traffic intersections have become a difficult problem for urban management.

SUMMARY

There is provided a method of recognizing illegal parking of a vehicle, a device, and a storage medium.

According to an aspect of the present disclosure, there is provided a method of recognizing illegal parking of a vehicle, the method including: obtaining a video image collected by an electronic device; recognizing a parking area of the vehicle in the video image; determining a shooting angle used by the electronic device for collecting the video image; determining an illegal parking area in the video image based on the shooting angle; and recognizing whether the vehicle is illegally parked or not based on the parking area of the vehicle and the illegal parking area.

According to an aspect of the present disclosure, there is provided an electronic device including: at least one processor; and a memory communicatively connected to the at least one processor; wherein the memory is stored with instructions capable of being executed by the at least one processor, the instructions are executed by the at least one processor, so that the at least one processor is capable of performing the method according to embodiments of the present disclosure.

According to an aspect of the present disclosure, therein is provided a non-transitory computer-readable storage medium stored with computer instructions, wherein the computer instructions are configured to cause a computer to perform the method according to embodiments of the present disclosure.

It should be understood that the content described in this section is not intended to identify key or critical features of embodiments of the present disclosure, nor is it intended to limit the scope of the present disclosure. Other features of the present disclosure will become readily understood from the following description.

BRIEF DESCRIPTION OF THE DRAWINGS

The accompanying drawings are used to better understand the solution of the present disclosure, and do not constitute a limitation to the present disclosure, in which.

DETAILED DESCRIPTION OF EMBODIMENTS

Exemplary embodiments of the present disclosure are described below with reference to the accompanying drawings, in which various details of embodiments of the present disclosure are included to facilitate understanding, which should be considered as exemplary only. Accordingly, those of ordinary skill in the art should understand that various changes and modifications may be made to embodiments described herein without departing from the scope and spirit of the present disclosure. Also, descriptions of well-known functions and constructions are omitted from the following descriptions for clarity and conciseness.

In the technical solution of the present disclosure, the collection, storage, use, processing, transmission, provision, disclosure, and application of the monitoring data involved all comply with the provisions of relevant laws and regulations, and do not violate public order and good customs.

In the technical solution of the present disclosure, authorization or consent is obtained from the user before the user's personal information is obtained or collected.

At present, in related art, illegal parking of non-motor vehicles is usually monitored manually. It should be understood that the solution of manual monitoring is time consuming and laborious, and is difficult to monitor all locations.

In this regard, embodiments of the present disclosure propose a multi-view-based method of recognizing illegal parking of a vehicle. For each frame of image decoded for a video stream, a similarity model may be used to match an illegal parking area under a corresponding camera angle (shooting angle). An instance segmentation model may be used to recognize a specific parking area of a vehicle (such as a non-motor vehicle). Then it is determined whether the specific parking area of the vehicle is within the corresponding illegal parking area or not. If the specific parking area of the vehicle is within the corresponding illegal parking area, a reminder may be sent. For example, a relevant business may be reminded that a relevant vehicle parked at a traffic intersection is illegal parked. Alternatively, for example, traffic management personnel may be reminded that there is a vehicle parked illegally at a traffic intersection.

The present disclosure will be described in detail below with reference to specific embodiments.

A system architecture of the method and the apparatus of recognizing illegal parking of a vehicle suitable for embodiments of the present disclosure is introduced as follows.

Figure 1A:
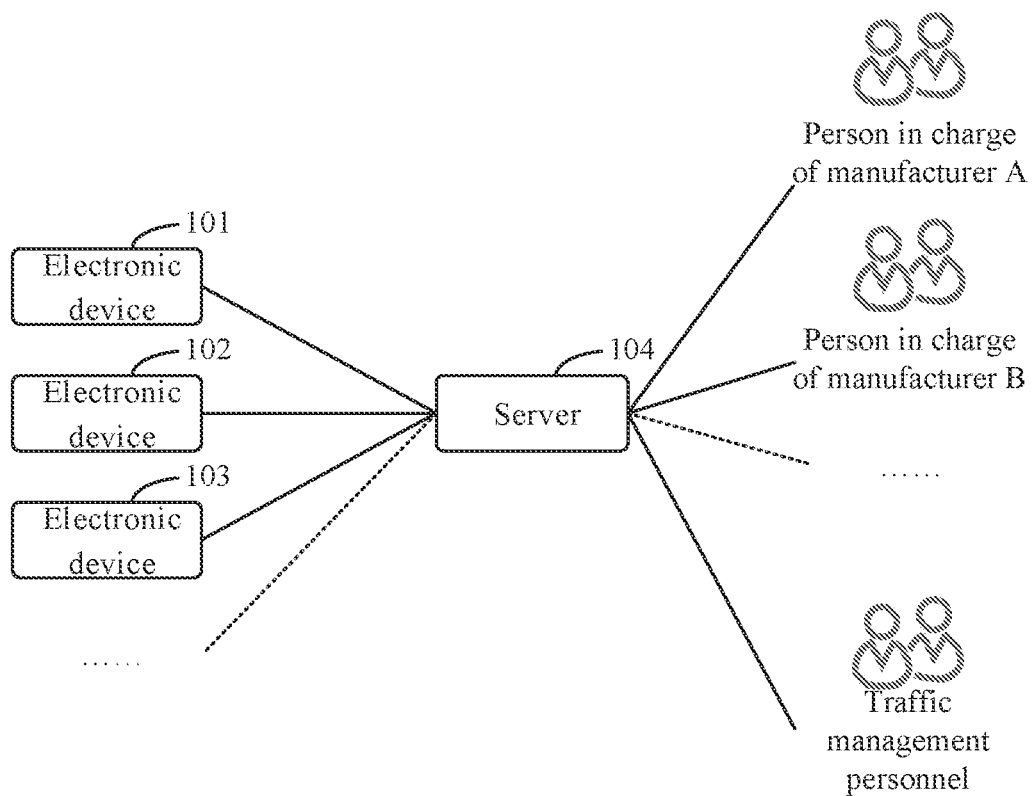
FIG. 1A exemplarily shows a system architecture suitable for embodiments of the present disclosure.

FIG. 1A exemplarily shows a system architecture of a method and an apparatus of recognizing illegal parking of a vehicle suitable for embodiments of the present disclosure. It should be noted that FIG. 1A is only an example of the system architecture to which one or more embodiments of the present disclosure may be applied, so as to help those skilled in the art to understand the technical content of the present disclosure, but it does not mean that one or more embodiments of the present disclosure cannot be applied to other environments or scenarios.

As shown in FIG. 1A, the system architecture 100 may include: a server 104 and electronic devices 101, 102, 103 . . . deployed at different traffic intersections.

It should be noted that, in embodiments of the present disclosure, the electronic devices 101, 102, 103 . . . may be monitoring devices capable of collecting video images from multiple views. For example, the electronic devices 101, 102, 103 . . . may be spherical monitoring cameras, which may monitor in 360° directions without dead ends. Video stream data collected in real time by any of the electronic devices 101, 102, 103 . . . may be uploaded to the server 104.

The video stream data may be decoded by the server 104, and whether there is any illegally parked vehicle in an illegal parking area under a current image shooting angle may be determined based on each frame of the decoded video images. Further, if it is determined that there is an illegally parked vehicle, a reminder may be sent to a corresponding vehicle management manufacturer/organization by the server 104, so as to remind the relevant manufacturer/organization the relevant vehicle parked at a certain traffic intersection is illegally parked which needs to be dealt with as soon as possible to smooth the road traffic.

Exemplarily, if it is determined that both vehicles of manufacturer/organization A and vehicles of manufacturer/organization B are illegally parked at a traffic intersection by image analysis, a reminder message may be sent to both a person in charge of manufacturer/organization A and a person in charge of manufacturer/organization B, so as to remind them as soon as possible to notify staff to deal with the illegally parked vehicles on site.

Alternatively or additionally, if it is determined that there is an illegally parked vehicle, the reminder information may be sent to management personnel of a relevant department (such as traffic management personnel) to promptly remind that there are a large or small number of illegally parked vehicles at a traffic intersection which need to be dealt with as soon as possible to smooth the road traffic.

With embodiments of the present disclosure, manual on-site or remote monitoring is not required, time and effort may be saved, and more locations may be monitored. In addition, compared with a method of single-view-based vehicle illegal parking recognition, the method of multi-view-based vehicle illegal parking recognition may monitor whether there is any illegally parked vehicle in each illegal parking area in an all-round way without dead ends, so that the illegally parked vehicle may be dealt with in time to smooth the road traffic.

It should be understood that the numbers of the electronic devices and the servers in FIG. 1A are merely illustrative. There may be any number of electronic devices and servers depending on implementation requirements.

An application scenario of the method and the apparatus of recognizing illegal parking of a vehicle suitable for embodiments of the present disclosure is introduced as follows.

It should be noted that the method and the apparatus of recognizing illegal parking of a vehicle provided by embodiments of the present disclosure may be used to recognize whether a vehicle (including a motor vehicle or a non-motor vehicle) is parked illegally or not. The non-motor vehicle may include but is not limited to one or more selected from: a personal electric vehicle, a shared electric vehicle produced or managed by a manufacturer/organization, a personal bicycle, a shared bicycle produced or managed by a manufacturer/organization, and/or the like.

In addition, it should be noted that the method and the apparatus of recognizing illegal parking of a vehicle provided by embodiments of the present disclosure may be a method and an apparatus of recognizing illegal parking of a vehicle based on multi-view monitoring.

Figure 1B:
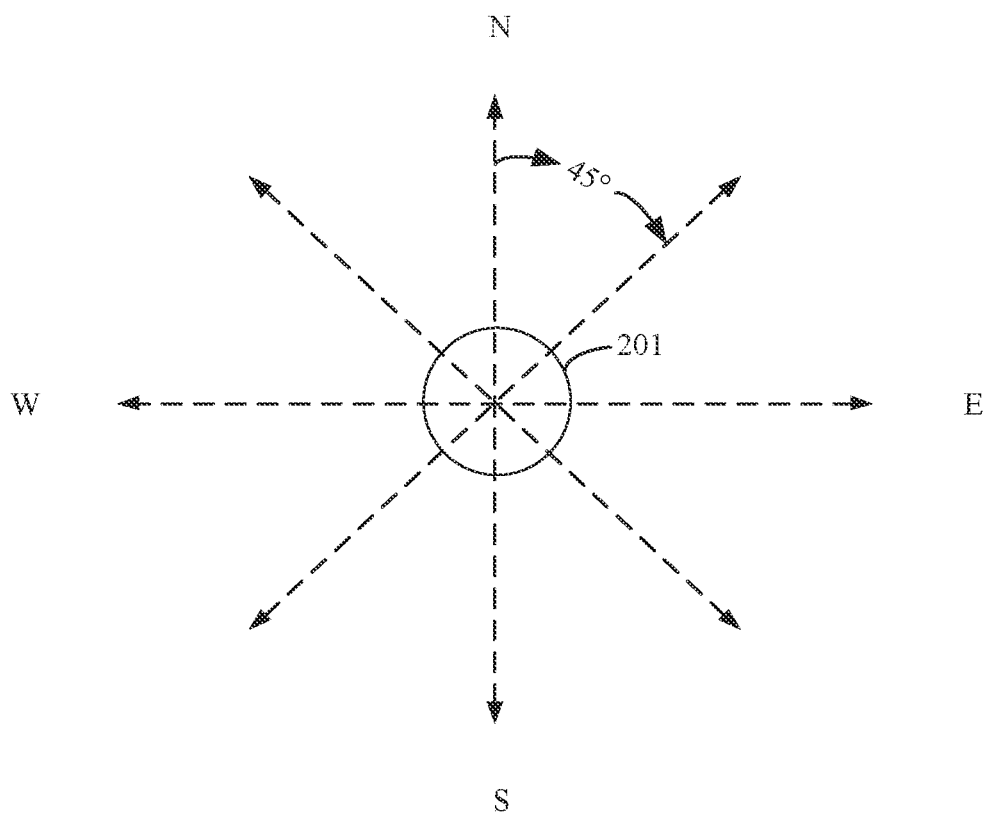
FIG. 1B exemplarily shows a scenario diagram of in which embodiments of the present disclosure may be implemented.

Exemplarily, as shown in FIG. 1B, a traffic intersection may be video monitored by a spherical monitoring camera 201 in an all-round 360° direction without dead ends. As an example, the 360° angle may be equally divided into 8 parts, and each rotation of an angle of 45° is defined as a new shooting angle. For example, the shooting angle may be defined as follows: due north, 45° north-west, due west, 45° south-west, due south, 45° south-east, due-east, 45° north-east. As another embodiment, the 360° may be equally divided into N parts, and N belongs to any integer greater than or equal to 2. In this way, each rotation of an angle of (360/N)° may be defined as a new shooting angle.

With reference to FIG. 1B, it should be understood that, in embodiments of the present disclosure, for an electronic device with a multi-view shooting function, the illegal parking areas that may be monitored by the electronic device under each shooting angle are different.

It should be noted that, in embodiments of the present disclosure, a shared bicycle will be used merely as an example to describe in detail a process or steps of recognizing the illegal parking of the vehicle.

According to embodiments of the present disclosure, a method of recognizing illegal parking of a vehicle is provided.

Figure 2:
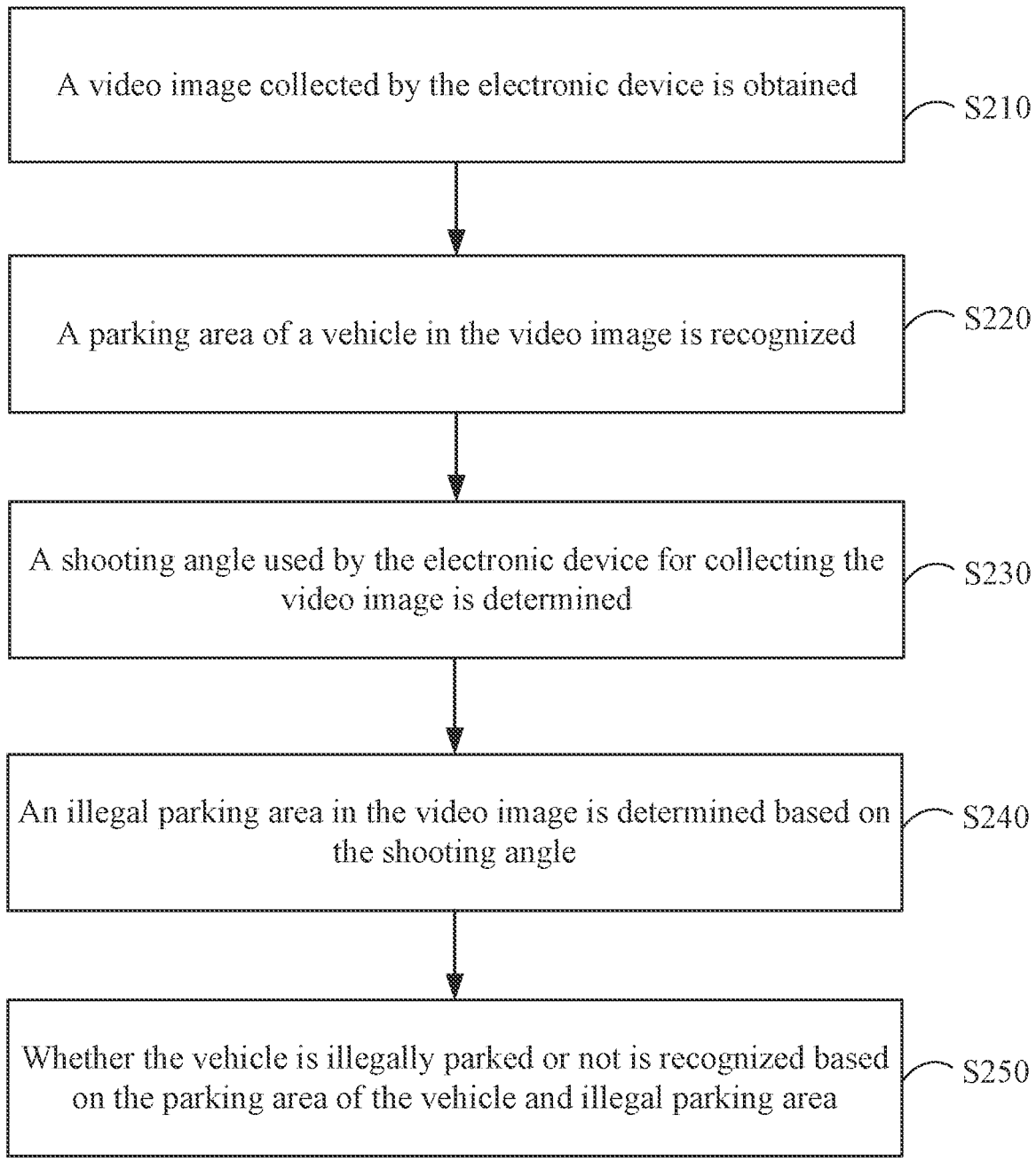
FIG. 2 exemplarily shows a flowchart of a method of recognizing illegal parking of a vehicle according to embodiments of the present disclosure.

FIG. 2 exemplarily shows a flowchart of a method of recognizing illegal parking of a vehicle according to one or more embodiments of the present disclosure.

As shown in FIG. 2, the method 200 of recognizing illegal parking of a vehicle may include operations S210-S250.

In operation S210, a video image collected by the electronic device is obtained.

In operation S220, a parking area of a vehicle in the video image is recognized.

In operation S230, a shooting angle used by the electronic device for collecting the video image is determined.

In operation S240, an illegal parking area in the video image is determined based on the shooting angle.

In operation S250, whether the vehicle is illegally parked or not is recognized based on the parking area of the vehicle and illegal parking area.

In some embodiments of the present disclosure, for each electronic device with the multi-view shooting function deployed at each traffic intersection, monitoring video stream data collected in real time may be decoded first, and then the above operations S210 to S250 may be performed for each frame of video image obtained after decoding, thereby recognizing whether there is any illegally parked vehicle in the illegal parking area at each traffic intersection or not.

If it is determined that there is an illegally parked vehicle, a reminder may be sent to a corresponding manufacturer/organization that the relevant vehicle parked at the traffic intersection is illegally parked which needs to be dealt with as soon as possible to smooth the road traffic.

Alternatively, if it is determined that there is an illegally parked vehicle, for example, a reminder may be sent to traffic management personnel to promptly remind that there are a large number or a small number of illegally parked vehicles a traffic intersection which need to be dealt with as soon as possible to smooth the road traffic.

It should be understood that, in embodiments of the present disclosure, the electronic device is provided with the multi-view shooting function, and the illegal parking areas that may be monitored by the electronic device under each shooting angle are different. Therefore, in a process of recognizing illegal parking of a vehicle, the shooting angle of the video image may be determined first for each frame of video image, and then the illegal parking area that may be monitored by the electronic device under the shooting angle may be determined. The parking area of the vehicle in the image (i.e., a specific parking area of the vehicle) may also be determined for each frame of video image. Finally, for the same frame of video image, whether the vehicle in the image is illegally parked or not may be recognized based on the parking area of the vehicle in the image and the illegal parking area that may be monitored under the current image shooting angle.

Through embodiments of the present disclosure, for each frame of video image collected by the multi-view monitoring device, it is possible to determine the shooting angle of the image first, then the illegal parking area in the image under the shooting angle is determined, and then whether there is any illegally parked vehicle in the illegal parking area in the image or not is recognized. Thus, an accuracy of recognizing whether there is any illegally parked vehicle in the current monitoring area or not is increased. Further, relevant personnel may be notified in time to deal with the illegal parking on site according to the violation conditions, so as to smooth each traffic intersection.

In addition, through embodiments of the present disclosure, it is possible to automatically recognize whether a non-motor vehicle is illegally parked or not, thereby the increasing number of non-motor vehicles such as shared bicycles may be monitored to intelligently assist relevant departments. Further, each vehicle manufacturer/organization may be promoted by continuous intelligent monitoring methods for a more standardized management, and people's travel may be promoted to be more convenient. In this way, a purpose of using scientific and technological means to make urban management more intelligent may be achieved.

As an optional embodiment, determining the shooting angle used by the electronic device for collecting the video image may include the following operations.

A plurality of reference images pre-collected by the electronic device under a plurality of given shooting angles are obtained. Different reference images in the plurality of reference images correspond to different shooting angles.

A similarity matching is performed between the video image and each of the plurality of reference images respectively, so as to obtain a target reference image with the highest similarity in the plurality of reference images to the video image.

A shooting angle corresponding to the target reference image is obtained, and the shooting angle corresponding to the target reference image is determined as the shooting angle used by the electronic device for collecting video images.

In embodiments of the present disclosure, a plurality of shooting angles of the electronic device may be predefined, and a reference image may be collected in each of the plurality of shooting angles in advance, and then an illegal parking area presented in each reference image may be recognized by using image recognition technology.

Exemplarily, the shooting angle may be defined as follows: due north, 45° north-west, due west, 45° south-west, due south, 45° south-east, due east, 45° north-east. The reference images pre-collected at these shooting angles are image 1 to image 8 in sequence. Further, the illegal parking areas presented in the 8 images may be respectively recognized, such as area 1 to area 8 in sequence.

In the process of real-time monitoring, each time a frame of video image is obtained, the video image may be matched with each reference image for similarity matching respectively, so as to obtain a reference image with the highest similarity to the video image. Since the shooting angle of the reference image is given, the shooting angle of the reference image may be directly used as the shooting angle of the video image to determine the illegal parking area included in the video image.

It should be understood that, in embodiments of the present disclosure, a similarity model may be used to determine a similarity between each frame of video image and each reference image.

Through embodiments of the present disclosure, the shooting angle of the video image obtained in real time may be determined by performing similarity matching between the video image obtained in real time and the reference image of the given shooting angle. Further, since the shooting angle may be determined, the illegal parking area included in the video image may also be accurately determined. In this way, whether there is any illegally parked vehicle in the illegal parking area in the image or not may be accurately determined.

Alternatively, as another optional embodiment, determining the shooting angle used by the electronic device for collecting the video image may include the following operations.

A plurality of reference images pre-collected by the electronic device under a plurality of given shooting angles may be obtained. Different reference images in the plurality of reference images correspond to different shooting angles.

The video image is reduced to a first image with a first preset size.

A similarity matching is performed between the first image and each of the plurality of reference images respectively, so as to obtain a target reference image with a highest similarity in the plurality of reference images to the first image.

A shooting angle corresponding to the target reference image is obtained, and the shooting angle corresponding to the target reference image is determined as the shooting angle used by the electronic device for collecting the video image.

In embodiments of the present disclosure, a similarity model may be used to determine a similarity between each frame of video image and each reference image.

It should be understood that in embodiments of the present disclosure, in the process of performing similarity matching on the images, only the shooting angle needs to be recognized, no target recognition and classification is required, and no keypoint recognition is required. Thus, requirements on the resolution of the image are not high. In addition, the smaller the size of the image, the higher the processing efficiency of image similarity matching.

Therefore, in embodiments of the present disclosure, before inputting each frame of video image into the similarity model, the video image may be preprocessed, such as scaling the video image to a fixed size (e.g., 224*224).

In addition, it should be understood that the value of pixels is generally required to be between 0 and 1 as an input of a convolutional neural network (similarity model). Therefore, in embodiments of the present disclosure, preprocessing the video image may further include normalizing the image after the image is scaled to a fixed size.

In embodiments of the present disclosure, a flow of an image normalization processing may include the following operations. For example, a value of each pixel point in the image is divided by 255, then a RGB mean is subtracted (e.g. [0.485, 0.456, 0.406]), and the obtained value is divided by a RGB variance (e.g. [0.229, 0.224, 0.225]).

Through embodiments of the present disclosure, the preprocessed image is input to the similarity model, the similarity matching is performed with the reference images of each given shooting angle, so that a feature distance between similar images is closer, and a feature distance between dissimilar images is farther, so as to classify the shooting angle of the video image.

As an optional embodiment, recognizing whether the vehicle is illegally parked or not based on the parking area of the vehicle and the illegal parking area may include the following operations.

Whether the parking area of the vehicle is within the illegal parking area or not is recognized based on the video image.

The vehicle is determined to be illegally parked in response to recognizing the parking area of the vehicle being within the illegal parking area based on the video image.

It should be understood that, in some embodiments of the present disclosure, if the parking area of the vehicle is completely within the illegal parking area, the vehicle is considered to be parked illegally. In other embodiments of the present disclosure, if the parking area of the vehicle intersects with the illegal parking area, the vehicle is considered to be parked illegally. In other embodiments of the present disclosure, if the parking area of the vehicle intersects with the illegal parking area, and the intersection exceeds a preset value, the vehicle is considered to be parked illegally.

Further, as an optional embodiment, recognizing whether the parking area of the vehicle is within the illegal parking area or not based on the video image may include: calculating whether the intersection between the parking area of the vehicle and the illegal parking area is greater than the preset value or not based on the video image.

If the intersection is greater than or equal to the preset value, the parking area of the vehicle is determined to be within the illegal parking area. If the intersection is smaller than the preset value, the parking area of the vehicle is determined to be not within the illegal parking area.

In some embodiments of the present disclosure, after the illegal parking area in the video image is recognized, all pixel values in the illegal parking area in the image may be set to 0 or 1. Taking 0 as an example, when the intersection between the parking area of the vehicle and the illegal parking area is calculated, the intersection may be determined by counting the number of pixels with the pixel value of 0 in the parking area of the vehicle in the image.

Alternatively, in some embodiments of the present disclosure, the intersection between the two may also be determined by calculating an overlapping area of the parking area of the vehicle and the illegal parking area in the image.

Through embodiments of the present disclosure, if the intersection between the illegal parking area in the video image and the specific parking area of the vehicle (such as a non-motor vehicle) is greater than a certain threshold, the specific parking area of the vehicle is indicated to have been fallen into the corresponding illegal parking area, that is, the vehicle is indicated to have been parked illegally. Further, after the vehicle is determined to be parked illegally, it is also possible to notify each vehicle manufacturer/organization or relevant department to deal with the illegally parked vehicle in time according to a classification result of the vehicle by an instance segmentation model.

In addition, in embodiments of the present disclosure, it is further possible to pay more attention on monitoring a location of the camera where illegal parking often occurs, so as to better assist the relevant department for better urban management.

As an optional embodiment, recognizing the parking area of the vehicle in the video image may include inputting the video image to an instance segmentation model to output a segmentation result of parking areas of different types of vehicles in the image.

In embodiments of the present disclosure, the video image may be directly input to a pre-trained instance segmentation model, so that a segmentation result of parking areas of different types of vehicles in the video image may be output.

Exemplarily, if both shared bicycles managed by manufacturer/organization A and shared bicycles managed by manufacturer/organization B are included in a video image, the segmentation result of the specific parking area of the shared bicycle managed by the manufacturer/organization A in the video image and the segmentation result of the specific parking area of the shared bicycle operated by manufacturer/organization B in the video image may be output by the instance segmentation model.

Alternatively, as an optional embodiment, recognizing the parking area of the vehicle in the video image may include the following operations.

The video image is reduced to a second image with a second preset size.

The second image is input to an instance segmentation model to output a segmentation result of parking areas of different types of vehicles in the image.

In embodiments of the present disclosure, the instance segmentation model may be used to output the segmentation result of parking areas of different types of vehicles in each video image. It should be noted that, in embodiments of the present disclosure, the adopted instance segmentation model may be a segmentation algorithm whose framework is based on Mask_R-CNN network. The algorithm may not only be used to segment types, but may also be used to segment whether objects of a same type are the same instance or not. Therefore, by using the instance segmentation model, a segmentation result of specific parking areas of different types of non-motor vehicles may be output, that is, the output result may include each non-motor vehicle type and the segmentation result of the parking areas of each type of non-motor vehicle.

It should be noted that, in embodiments of the present disclosure, the video image may be preprocessed before inputting the video image to the instance segmentation model for processing.

In embodiments of the present disclosure, since target detection, classification and segmentation in image segmentation are required, a requirement for image resolution is slightly higher compared with image similarity matching, and the image input to the model is expected to be larger. Therefore, in embodiments of the present disclosure, in a process of recognizing the parking area of the vehicle in the video image, the video image may also be reduced to an image of a fixed size. However, in this process, an extent of image reduction may be lower than an extent of image reduction in the process of image similarity matching. That is, the second preset size may be larger than the first preset size.

Exemplarily, in embodiments of the present disclosure, each frame of video image may be preprocessed before the video image is input to the instance segmentation model. For example, the video image may be scaled to a fixed size (e.g., 800*800).

In addition, it should be understood that a value of pixels is generally required to be between 0 and 1 for an input of the instance segmentation model. Therefore, in embodiments of the present disclosure, preprocessing the video image in the process of image segmentation may further include: normalizing the image after scaling the image to a fixed size.

In embodiments of the present disclosure, a flow of an image normalization processing may include the following operations. For example, a value of each pixel point in the image is divided by 255, then a RGB mean is subtracted (e.g. [0.485, 0.456, 0.406]), and the obtained value is divided by a RGB variance (e.g. [0.229, 0.224, 0.225]).

Through embodiments of the present disclosure, the preprocessed image is input to the instance segmentation model, the similarity matching is performed between the reference images of each given shooting angle, so that a feature distance between similar images is closer, and a feature distance between dissimilar images is farther, so as to classify the shooting angle of the video image.

In addition, as an optional embodiment, the above-mentioned vehicles may include but are not limited to: motor vehicles and non-motor vehicles. Non-motor vehicles may further include but are not limited to: a personal electric vehicle, a shared electric vehicle produced by each business, a personal bicycle, a shared bicycle produced by each business, and the like.

Embodiments of the present disclosure will be described in detail below with reference to FIG. 3 and specific embodiments.

Figure 3:
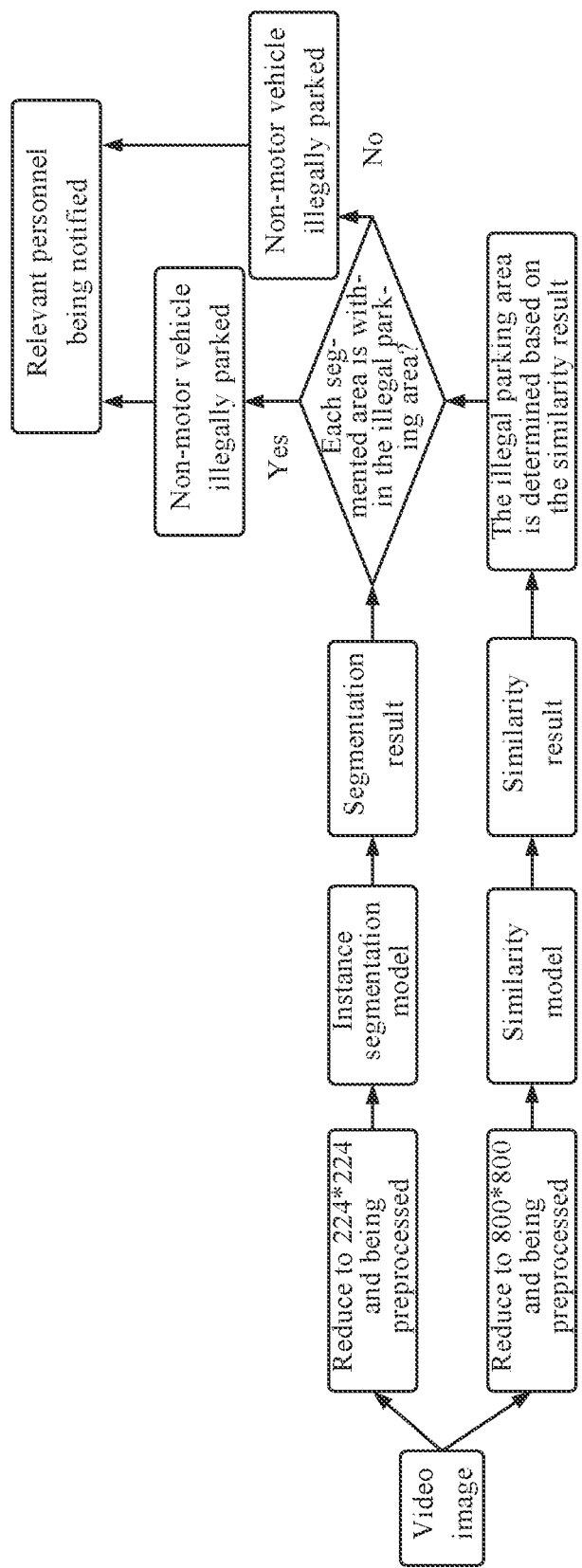
FIG. 3 exemplarily shows a schematic diagram of monitoring illegal parking of a non-motor vehicle according to embodiments of the present disclosure.

As shown in FIG. 3, the video image obtained by decoding the monitoring video stream may be input into two branches.

One branch is used to determine the shooting angle of the video image and the illegal parking area included in the image under the shooting angle through the image similarity matching. The branch includes the following processes: the video image is scaled to a fixed size of 224*224, and image preprocessing is performed; the image after being preprocessed is input to the similarity model; the image similarity matching is performed through the model, and the similarity result is output; and the illegal parking area is determined based on the similarity result.

In addition, the other branch is used to determine the specific parking area of the photographed non-motor vehicle through the image segmentation. The branch includes the following processes: the video image is scaled to a fixed size of 800*800, and image preprocessing is performed; the image after being preprocessed is input to the instance segmentation model for non-motor vehicles; the image recognition and segmentation is performed through the model, and the segmentation result of the specific parking area (each segmented area) of each type of non-motor vehicles in the image are output.

Then, whether each segmented area is within the illegal parking area or not may be determined based on the processing results of the above two branches. If it is within the illegal parking area, the corresponding non-motor vehicle is considered to be parked illegally. In addition, in this case, relevant personnel may be notified according to the recognition result. If it is not within the illegal parking area, the corresponding non-motor vehicle is considered to be parked normally, that is, there is no illegal parking. In addition, in this case, the relevant personnel may also be notified based on the recognition result.

According to embodiments of the present disclosure, an apparatus of recognizing illegal parking of a vehicle is also provided.

Figure 4:
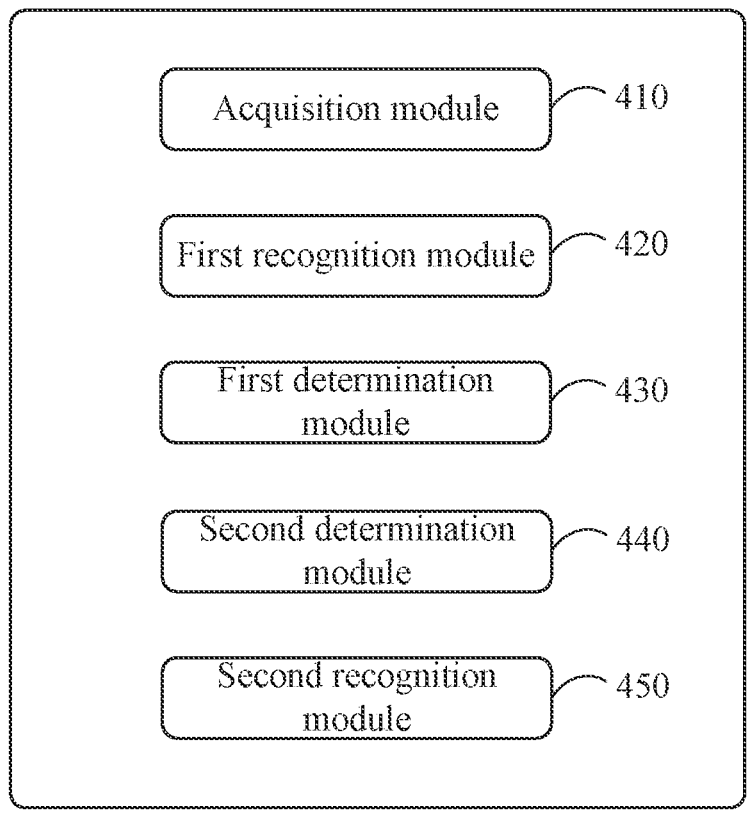
FIG. 4 exemplarily shows a block diagram of an apparatus of recognizing illegal parking of a vehicle according to embodiments of the present disclosure.

FIG. 4 exemplarily shows a block diagram of an apparatus of recognizing illegal parking of a vehicle according to embodiments of the present disclosure.

As shown in FIG. 4, the apparatus 400 of recognizing illegal parking of a vehicle may include: an acquisition module 410, a first recognition module 420, a first determination module 430, a second determination module 440, and a second recognition module 450.

Specifically, the acquisition module 410 is used to obtain a video image collected by the electronic device.

The first recognition module 420 is used to recognize a parking area of the vehicle in the video image.

The first determination module 430 is used to determine a shooting angle used by the electronic device for collecting the video image.

The second determination module 440 is used to determine an illegal parking area in the video image based on the shooting angle.

The second recognition module 450 is used to recognize whether the vehicle is illegally parked or not based on the parking area of the vehicle and the illegal parking area.

As an optional embodiment, the first determination module includes: a first acquisition unit used to obtain a plurality of reference images pre-collected by the electronic device under a plurality of given shooting angles, and different reference images in the plurality of reference images correspond to different shooting angles; a first matching unit used to perform a similarity matching between the video image and each of the plurality of reference images respectively, so as to obtain a target reference image with a highest similarity in the plurality of reference images to the video image; and a second acquisition unit used to obtain a shooting angle corresponding to the target reference image, and the shooting angle corresponding to the target reference image is determined as the shooting angle used by the electronic device for collecting the video image.

As an optional embodiment, the first determination module includes: a third acquisition unit used to obtain a plurality of reference images pre-collected by the electronic device under a plurality of given shooting angles, and different reference images in the plurality of reference images correspond to different shooting angles; a preprocessing unit used to reduce the video image to a first image with a first preset size; a second matching unit used to perform a similarity matching between the first image and each of the plurality of reference images respectively, so as to obtain a target reference image with the highest similarity in the plurality of reference images to the first image; and a fourth acquisition unit used to obtain a shooting angle corresponding to the target reference image, and the shooting angle corresponding to the target reference image is determined as the shooting angle used by the electronic device for collecting the video image.

As an optional embodiment, the second recognition module includes: a recognition unit used to recognize whether the parking area of the vehicle is within the illegal parking area or not based on the video image; and a determination unit used to determine the vehicle is illegally parked in response to recognizing the parking area of the vehicle being within the illegal parking area based on the video image.

As an optional embodiment, the recognition unit is also used to calculate whether an intersection between the parking area of the vehicle and the illegal parking area is greater than a preset value or not based on the video image.

If the intersection is greater than or equal to the preset value, the parking area of the vehicle is determined to be within the illegal parking area.

As an optional embodiment, the first recognition module is also used to input the video image to an instance segmentation model to output a segmentation result of parking areas of different types of vehicles in the image.

As an optional embodiment, the first recognition module is also used to reduce the video image to a second image with a second preset size; and input the second image to an instance segmentation model to output a segmentation result of parking areas of different types of vehicles in the image.

As an optional embodiment, the vehicle includes a motor vehicle and a non-motor vehicle.

It should be understood that embodiments of the apparatus of the present disclosure are the same or similar to embodiments of the method of the present disclosure, technical problems solved and technical effects achieved are also the same or similar, which will not be repeated here.

According to embodiments of the present disclosure, an electronic device, a readable storage medium, and a computer program product are also provided.

Figure 5:
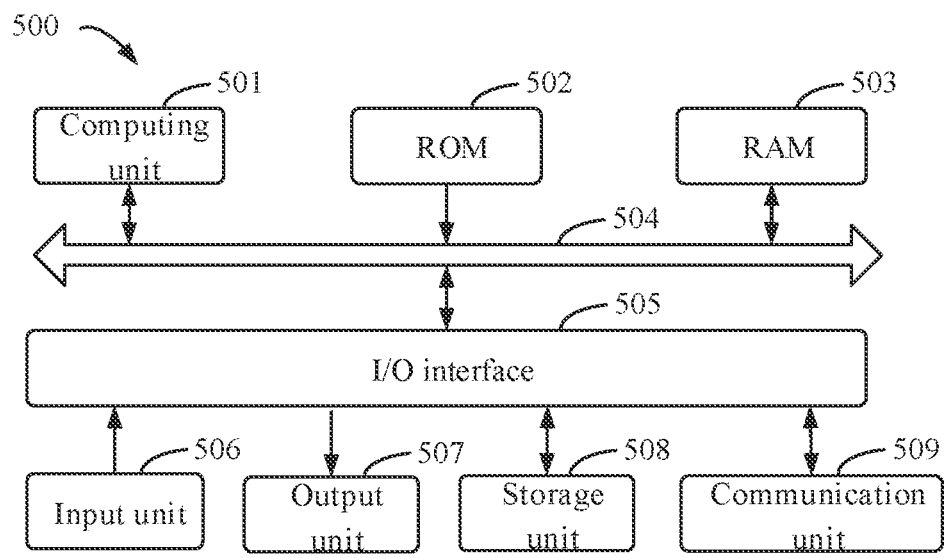
FIG. 5 exemplarily shows a block diagram of an electronic device used to implement embodiments of the present disclosure.

FIG. 5 shows a schematic block diagram of an exemplary electronic device 500 capable of implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital processor, a cellular phone, a smart phone, a wearable device, and other similar computing apparatuses. The components shown herein, connections and relationships thereof, and functions thereof are by way of example only, and are not intended to limit implementations of the disclosure described and/or claimed herein.

As shown in FIG. 5, the electronic device 500 includes a computing unit 501, the computing unit is capable of performing various suitable actions and processing based on a computer program stored in a read-only memory (ROM) 502 or computer program uploaded to a random-access memory (RAM) from a storage unit 508. In the RAM 503, various programs and data required for the operation of the electronic device 500 may also be stored. The computing unit 501, the ROM 502, and the RAM 503 are connected to each other through a bus 504. An input/output (I/O) interface 505 is also connected to bus 504.

A plurality of components in the electronic device 500 are connected to the I/O interface 505, including: an input unit 506, such as a keyboard, a mouse, etc.; an output unit 507, such as various types of displays, speakers, etc.; a storage unit 508, such as a magnetic disk, an optical disk, etc.; and a communication unit 509, such as a network card, a modem, a wireless communication transceiver, and the like. The communication unit 509 enables the device 500 to exchange information/data with other devices through a computer network such as the Internet and/or various telecommunication networks.

The computing unit 501 may be various general-purpose and/or special-purpose processing components with processing and computing capabilities. Some examples of the computing unit 501 include, but are not limited to, a central processing unit (CPU), a graphics processing unit (GPU), various specialized artificial intelligence (AI) computing chips, various computing units run machine learning model algorithms, a digital signal processor (DSP), and any suitable processor, controller, microcontroller, etc. The computing unit 501 is used to implement the various methods and processing described above, such as the method of recognizing illegal parking of the vehicle. For example, in some embodiments, the method of recognizing illegal parking of the vehicle may be implemented as a computer software program tangibly contained in a machine-readable medium, such as the storage unit 508. In some embodiments, part or all of the computer program may be loaded and/or installed on the device 500 via the ROM 502 and/or the communication unit 509. When the computer program is loaded to RAM 503 and executed by the computing unit 501, one or more steps of the above-described method of recognizing illegal parking of the vehicle may be performed. Alternatively, in other embodiments, the computing unit 501 may be configured by any other suitable means (e.g., by means of firmware) to perform the method of recognizing illegal parking of the vehicle.

Various implementations of the system and technique described herein above may be implemented in a digital electronic circuit, an integrated circuit system, a field programmable gate array (FPGA), an application specific integrated circuit (ASIC), an application specific standard product (ASSP), a System-on-a-chip (SOC), a complex programmable logic device (CPLD), computer hardware, firmware, software, and/or a combination thereof. These various implementations may include: being implemented in one or more computer programs executable and/or interpretable on a programmable system including at least one programmable processor. The programmable processor may be a special-purpose or general-purpose programmable processor, the programmable processor may receive data and instructions from a storage system, at least one input apparatus, and at least one output apparatus, and transmit data and instructions to the storage system, the at least one input apparatus, and the at least one output apparatus.

Program codes for implementing the method of the present disclosure may be written in any combination of one or more programming languages. The program codes may be provided to a processor or controller of a general-purpose computer, a special-purpose computer or other programmable data processing apparatuses, such that when executed by the processor or controller, the program codes enables functions/operations specified in the flowchart and/or block diagram to be implemented. The program codes may be executed entirely on the machine, partly on the machine, partly on the machine and partly on a remote machine as a stand-alone software package or entirely on the remote machine or server.

In the context of the present disclosure, a machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read only memory (ROM), an erasable programmable read only memory (EPROM or flash memory), an optical fiber, a compact disk read only memory (CD-ROM), an optical storage device, a magnetic storage device, or any suitable combination thereof.

To provide an interaction with a user, the system and technique described herein may be implemented on a computer having: a display apparatus (e.g., a CRT (cathode ray tube) or an LCD (liquid crystal display) monitor) for displaying information to the user; and a keyboard and pointing apparatus (e.g., a mouse or trackball) through which the user may provide input to the computer. Other types of apparatuses may also be used to provide the interaction with the user. For example, a feedback provided to the user may be any form of sensory feedback (e.g., visual feedback, auditory feedback, or tactile feedback); and may receive input in any form (including acoustic input, voice input, or tactile input) from the user.

The system and technique described herein may be implemented on a computing system including back-end components (e.g., a data server), or a computing system including middleware components (e.g., an application server), or a computing system including front-end components (e.g., a user's computer with a graphical user interface or a web browser through which the user may interact with implementations of the system and technique described herein), or a computing system including any combination of such back-end components, middleware components, or front-end components. The components of the system may be interconnected by any form or medium of digital data communication (e.g., a communication network). Examples of the communication network includes: a Local Area Network (LAN), a Wide Area Networks (WAN), and the Internet.

A computer system may include a client and a server. The client and the server are generally remote from each other and usually interact through a communication network. A relationship between the client and the server is generated by computer programs running on respective computers and having a client-server relationship to each other. The server may be a cloud server, also known as a cloud computing server or a cloud host, which is a host product in the cloud computing service system to solve defects of difficult management and weak business expansion of traditional physical hosts and VPS services ("Virtual Private Server", or "VPS" for short). The server may also be a server of a distributed system, or a server combined with a blockchain.

It should be understood that steps may be reordered, added or deleted using the various forms of the flow shown above. For example, the steps described in the present disclosure may be executed in parallel, sequentially, or in different orders, as long as the desired result of the technical solution disclosed in the present disclosure may be achieved, which is not limited herein.

The above-mentioned specific embodiments do not constitute a limitation to the protection scope of the present disclosure. It should be understood by those skilled in the art that various modifications, combinations, sub-combinations and substitutions may occur depending on design requirements and other factors. Any modifications, equivalent replacements, and improvements made within the spirit and principles of the present disclosure should be included within the protection scope of the present disclosure

What is claimed is:

1. A method of recognizing illegal parking of a vehicle, the method comprising:

obtaining a video image collected by an electronic device;
recognizing a parking area of the vehicle in the video image;
determining a shooting angle used by the electronic device for collecting the video image;
determining an illegal parking area in the video image based on the shooting angle used by the electronic device for collecting the video image; and
recognizing whether the vehicle is illegally parked or not based on the parking area of the vehicle and the illegal parking area,
wherein the determining a shooting angle used by the electronic device for collecting the video image comprises:
obtaining a plurality of reference images pre-collected by the electronic device under a plurality of given shooting angles, wherein different reference images in the plurality of reference images correspond to different shooting angles;
performing a similarity matching between the video image and each of the plurality of reference images respectively, so as to obtain a target reference image with a highest similarity in the plurality of reference images to the video image; and
obtaining a shooting angle corresponding to the target reference image, and determining the shooting angle corresponding to the target reference image as the shooting angle used by the electronic device for collecting the video image.

2. The method according to claim 1, wherein the determining a shooting angle used by the electronic device for collecting the video image further comprises reducing the video image to a first image with a first preset size, and
wherein the performing a similarity matching between the video image and each of the plurality of reference images respectively, so as to obtain a target reference image with a highest similarity in the plurality of reference images to the video image comprises performing a similarity matching between the first image and each of the plurality of reference images respectively, so as to obtain a target reference image with a highest similarity in the plurality of reference images to the first image.

3. The method according to claim 1, wherein the recognizing whether the vehicle is illegally parked or not based on the parking area of the vehicle and the illegal parking area comprises:
recognizing whether the parking area of the vehicle is within the illegal parking area or not based on the video image; and
determining the vehicle is illegally parked in response to recognizing the parking area of the vehicle is within the illegal parking area based on the video image.

4. The method according to claim 3, wherein the recognizing whether the parking area of the vehicle is within the illegal parking area or not based on the video image comprises calculating whether an intersection between the parking area of the vehicle and the illegal parking area is greater than a preset value or not based on the video image, wherein the parking area of the vehicle is determined to be within the illegal parking area in response to the intersection being greater than or equal to the preset value.

5. The method according to claim 1, wherein the recognizing a parking area of the vehicle in the video image comprises inputting the video image to an instance segmentation model to output a segmentation result of parking areas of different types of vehicles in the image.

6. The method according to claim 1, wherein the recognizing a parking area of the vehicle in the video image comprises:
reducing the video image to a second image with a second preset size; and
inputting the second image to an instance segmentation model to output a segmentation result of parking areas of different types of vehicles in the image.

7. The method according to claim 1, wherein the vehicle comprises: a motor vehicle and a non-motor vehicle.

8. The method according to claim 2, wherein the recognizing whether the vehicle is illegally parked or not based on the parking area of the vehicle and the illegal parking area comprises:
recognizing whether the parking area of the vehicle is within the illegal parking area or not based on the video image; and
determining the vehicle is illegally parked in response to recognizing the parking area of the vehicle being within the illegal parking area based on the video image.

9. An electronic device, comprising:
at least one processor; and
a memory communicatively connected to the at least one processor, wherein the memory has instructions that, when executed by the at least one processor, are configured to cause the at least one processor to at least:
obtain a video image collected by an electronic device;
recognize a parking area of a vehicle in the video image;
obtain a plurality of reference images pre-collected by the electronic device under a plurality of given shooting angles, wherein different reference images in the plurality of reference images correspond to different shooting angles;
perform a similarity matching between the video image and each of the plurality of reference images respectively, so as to obtain a target reference image with a highest similarity in the plurality of reference images to the video image;
obtain a shooting angle corresponding to the target reference image;
determine a shooting angle used by the electronic device for collecting the video image based on the obtained shooting angle corresponding to the target reference image;
determine an illegal parking area in the video image based on the shooting angle used by the electronic device for collecting the video image; and
recognize whether the vehicle is illegally parked or not based on the parking area of the vehicle and the illegal parking area.

10. The electronic device according to claim 9, wherein the instructions are further configured to cause the at least one processor to:
reduce the video image to a first image with a first preset size; and
perform a similarity matching between the first image and each of the plurality of reference images respectively, so as to obtain a target reference image with a highest similarity in the plurality of reference images to the first image.

11. The electronic device according to claim 9, wherein the instructions are further configured to cause the at least one processor to:
recognize whether the parking area of the vehicle is within the illegal parking area or not based on the video image; and
determine the vehicle is illegally parked in response to recognizing the parking area of the vehicle being within the illegal parking area based on the video image.

12. The electronic device according to claim 11, wherein the instructions are further configured to cause the at least one processor to calculate whether an intersection between the parking area of the vehicle and the illegal parking area is greater than a preset value or not based on the video image, wherein the parking area of the vehicle is determined to be within the illegal parking area in response to the intersection being greater than or equal to the preset value.

13. The electronic device according to claim 9, wherein the instructions are further configured to cause the at least one processor to input the video image to an instance segmentation model to output a segmentation result of parking areas of different types of vehicles in the image.

14. The electronic device according to claim 9, wherein the instructions are further configured to cause the at least one processor to:
reduce the video image to a second image with a second preset size; and
input the second image to an instance segmentation model to output a segmentation result of parking areas of different types of vehicles in the image.

15. The electronic device according to claim 9, wherein the vehicle comprises: a motor vehicle and a non-motor vehicle.

16. A non-transitory computer-readable storage medium having computer instructions stored therein, the computer instructions, when executed by a computer system, configured to cause the computer system to at least:
obtain a video image collected by an electronic device;
recognize a parking area of the vehicle in the video image;
obtain a plurality of reference images pre-collected by the electronic device under a plurality of given shooting angles, wherein different reference images in the plurality of reference images correspond to different shooting angles:
perform a similarity matching between the video image and each of the plurality of reference images respectively, so as to obtain a target reference image with a highest similarity in the plurality of reference images to the video image;
obtain a shooting angle corresponding to the target reference image;
determine a shooting angle used by the electronic device for collecting the video image based on the obtained shooting angle corresponding to the target reference image;
determine an illegal parking area in the video image based on the shooting angle used by the electronic device for collecting the video image; and
recognize whether the vehicle is illegally parked or not based on the parking area of the vehicle and the illegal parking area.

17. The non-transitory computer-readable storage medium of claim 16, wherein the instructions are further configured to cause the computer system to:
reduce the video image to a first image with a first preset size; and
perform a similarity matching between the first image and each of the plurality of reference images respectively, so as to obtain a target reference image with a highest similarity in the plurality of reference images to the first image.

18. The non-transitory computer-readable storage medium of claim 16, wherein the instructions are further configured to cause the computer system to:
  recognize whether the parking area of the vehicle is within the illegal parking area or not based on the video image; and
  determine the vehicle is illegally parked in response to recognizing the parking area of the vehicle being within the illegal parking area based on the video image.

19. The non-transitory computer-readable storage medium of claim 16, wherein the instructions are further configured to cause the computer system to input the video image to an instance segmentation model to output a segmentation result of parking areas of different types of vehicles in the image.

20. The non-transitory computer-readable storage medium of claim 16, wherein the instructions are further configured to cause the computer system to:
  reduce the video image to a second image with a second preset size; and
  input the second image to an instance segmentation model to output a segmentation result of parking areas of different types of vehicles in the image.

* * * * *